United States Patent [19]

Jönsson

[11] 4,159,350
[45] Jun. 26, 1979

[54] METHOD AND APPARATUS FOR DESALINATION OF WHEY

[75] Inventor: Hans B. Jönsson, Lund, Sweden

[73] Assignee: Svenska Mejeriernas Riksforening U P A, Stockholm, Sweden

[21] Appl. No.: 902,532

[22] Filed: May 3, 1978

[30] Foreign Application Priority Data

May 10, 1977 [SE] Sweden ............................... 7705424

[51] Int. Cl.² .......................... A23C 21/00; A23C 9/14
[52] U.S. Cl. ....................................... 426/271; 210/32
[58] Field of Search ....................... 426/271, 491, 583; 210/26, 32, 34, 37 R, 38 R, 38 A

[56] References Cited

U.S. PATENT DOCUMENTS

| | | | |
|---|---|---|---|
| 2,404,367 | 7/1946 | Durant et al. | 210/37 R |
| 2,511,825 | 6/1950 | Myers | 426/271 |
| 2,566,477 | 9/1951 | Abrahamczik | 426/271 X |
| 2,708,633 | 5/1955 | Stimpson et al. | 426/271 |
| 2,776,258 | 1/1957 | Gilliland | 210/34 X |
| 2,879,166 | 3/1959 | Wilcox | 426/271 |
| 2,990,284 | 6/1961 | Freund et al. | 426/271 |
| 3,317,424 | 5/1967 | Schmidt | 210/32 X |

FOREIGN PATENT DOCUMENTS

496391 9/1953 Canada ..................... 426/271

OTHER PUBLICATIONS

Garrett; Application of Ionic Exchangers to the Processing of Milk Products; International Dairy Congress, Stockholm, 1949, vol. 3, pp 49-55.

Webb; Byproducts from Milk (Ed. 2); The AVI Pub. Co. Inc., 1970, Westport, Conn.; pp. 312, 315.

Primary Examiner—Kenneth M. Schor
Attorney, Agent, or Firm—Karl W. Flocks

[57] ABSTRACT

A method for desalination of whey which is conducted through an anion exchanger and a cation exchanger. The whey is first conducted through a weakly basic anion exchanger in hydrogen carbonate form and then through a weakly acidic cation exchanger in ammonium form. The ion exchangers are regenerated by treatment with an ammonium hydrogen carbonate solution, whereupon the ammonium and hydrogen carbonate ions present in the whey are removed by evaporation.

The invention also relates to an apparatus for carrying out the method. The apparatus comprises ion exchange columns having inlet and outlet ends. Each column is connected at its inlet end to means for supplying whey to be desalted and regeneration solution, and means for removing residual acid and alkali. Each ion exchange column has at its outlet end means for removing spent regeneration solution and supplying acid and alkali. The outlet end is further connected to evaporators for vaporization of treated whey. The apparatus further comprises a distiller for distillation of spent regeneration solution, and a tank for holding regeneration solution.

4 Claims, 2 Drawing Figures

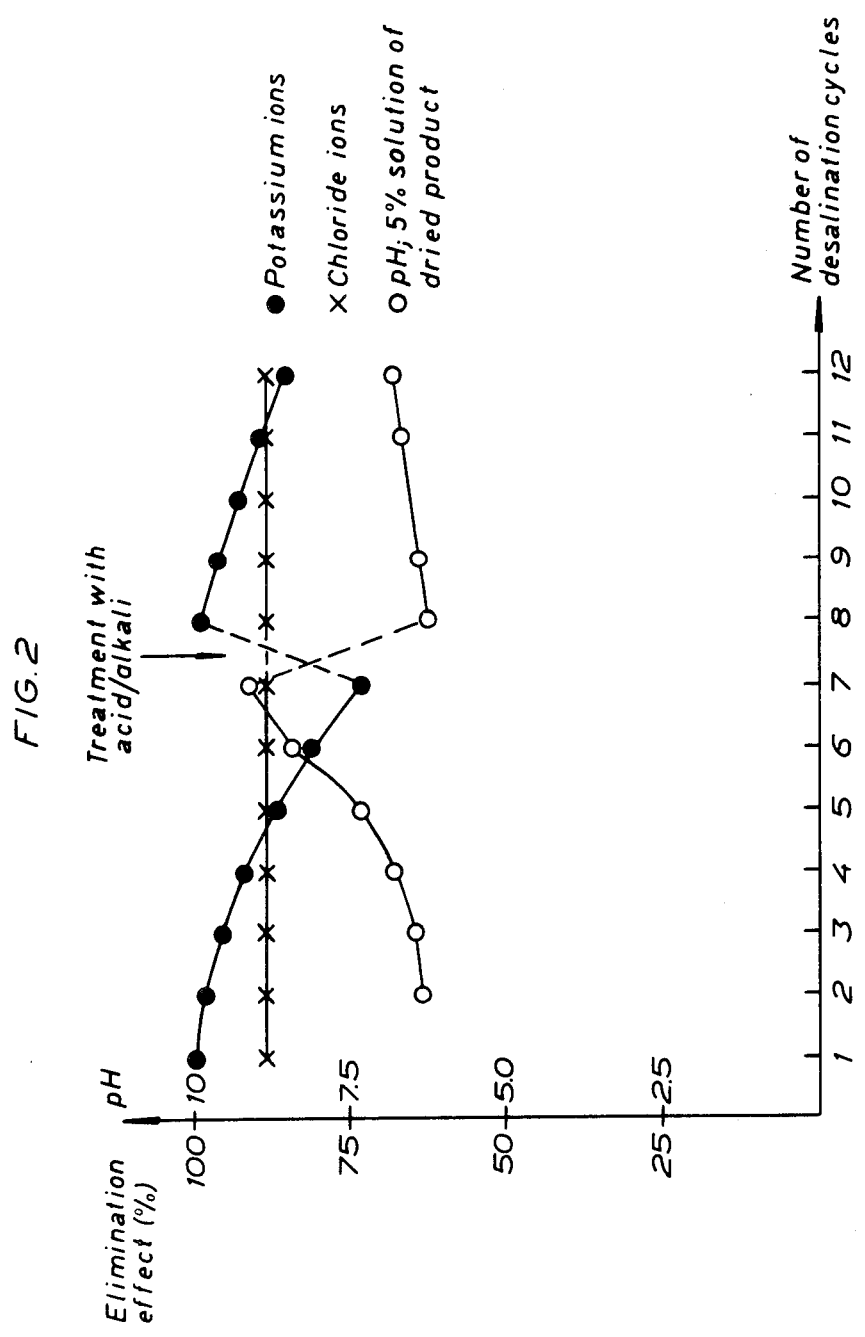

METHOD AND APPARATUS FOR DESALINATION OF WHEY

The present invention relates to a method for desalination of whey by ion exchange, and to an apparatus for carrying out the method.

In the preparation of cheese, there is obtained a large quantity of whey as a by-product. Before the authorities had placed demands on efficient wastewater treatment, this whey was discharged into sewage systems, thus polluting associated waterways. Along with an increasingly more rigorous environmental legislation and following the occurrence of novel processes for recovering the useful whey constituents, it has become more attractive to refine the whey. At present, the major part of the whey is dried to whey powder which is used in fodder mixtures. However, the normally high salt content in whey powder restricts the use of whey as fodder and, in practice, makes it almost impossible to use whey powder in products intended for human consumption. A particularly harmful constituent in whey is nitrate which in whey powder may amount to 2000 mg/kg. Hence, in order to enhance the usefulness of whey powder for foodstuff production and in particular for preparing food for infants, it is necessary to remove the salt from the whey.

Table 1 shows the total composition of whey, and Table 2 the ion composition.

TABLE 1

| Main constituents of whey (whey with no addition of salt) | |
|---|---|
| Constituent | Content (%) |
| Protein | 0.9 |
| Lactose | 4.7 |
| Fat | 0.4 |
| Ash | 0.40 |
| Water | 93.6 |

TABLE 2

| Normal salt ion concentrations in whey (whey with no addition of salt) | | | | | |
|---|---|---|---|---|---|
| Cations | | | Anions | | |
| ion | % | m.eq./l | ion | % | m.eq./l |
| Na | 0.045 | 19.6 | Cl | 0.110 | 30.8 |
| K | 0.155 | 39.6 | NO$_3$ | 0.013 | 2.1 |
| Ca | 0.033 | 16.6 | Citrate | 0.16 | 24.5 |
| Mg | 0.0072 | 6.0 | Phosphate | 0.045 | 17.5 |
|  |  | 81.8 | Balance |  | ca.7 (HCO$_3^-$, |
|  |  |  |  |  | 81.9 lactate) |

In Table 2, the contents in m.eq./l for anions which participate in protolytic reactions, have been calculated for a pH value in the whey of 6.6. When salt is added to the cheese in the vat, the anion and cation concentrations increase in the whey by up to 65 m.eq./l on account of the added sodium chloride. It is however technically possible in the manufacture of cheese to avoid the addition of salt to the whey.

For desalination of whey, use has previously been made of two different processes, namely electrodialysis and conventional ion exchange, i.e. with the ion exchangers in H$^+$ and OH$^-$ form, respectively. Theoretically, it would also be possible to desalt whey by gel filtration and ultrafiltration. However, the separation capability of these methods is dependent upon the existence of great differences in molecular size between the substances to be separated from each other. Since there is only a slight difference in molecular size between lactose and salt ions in whey, these methods cannot be used on an industrial scale at present for the desalination of whey, without entailing great losses of lactose. In the electrodialysis of whey, the salt ions migrate under the influence of an electric field, the positive ions (cations) towards the cathode and the negative ions (anions) towards the anode. The ions are separated by a membrane system consisting of anion-exchange membranes alternating with cation-exchange membranes. The anion-exchange membranes allow passage substantially only of anions and the cation-exchange membranes substantially only of cations. Some advantages gained by electrodialysis of whey are that whey concentrate (40–50% total solids) can be desalted and that the method is environmentally beneficial. However, this method suffers from a large number of considerable drawbacks, of which the most important are:

(a) The desalination effect cannot, without high costs, be raised to more than about 70%.

(b) Short life of ion-exchange membranes.

(c) Frequent stoppages during operation for cleaning of membranes.

(d) Losses of lactose by dialyzing effect of membranes.

(e) Slight denaturation of whey proteins.

(f) Multivalent ions are difficult to eliminate.

(g) Lowered pH value (ca. 4.6) in treated whey.

In the desalination of whey by conventional ion exchange the whey is conducted through cation exchangers in H$^+$ form and anion exchangers in OH$^-$ form. THe advantages of this method reside, on the one hand, in that the equipment is simple, and, on the other hand, in that complete desalination can be obtained at a relatively low cost. However, this method also suffers from a number of serious drawbacks, of which the most important are:

(a) Environmentally harmful. Large amounts of salts in the wastewater, above all sodium chloride from the regeneration. In total, about 17 kg of salts per m$^3$ of whey are discharged.

(b) The regeneration requires large amounts of dangerous chemicals, namely concentrated hydrochloric acid and sodium hydroxide.

(c) Great variations in the pH value (between 1.7 and 10) of the whey during ion exchange, which occasions protein denaturation and clogging of the ion exchangers.

(d) Losses of protein by absorption to the anion exchanger.

(e) Whey concentrate cannot be treated.

In the sugar industry, ion exchangers are used for purification of thin juice, as is disclosed in Swedish Patent Specification No. 303,283. As described in this patent specification, a technical sugar solution, from which potassium ions have previously been removed in order to obviate problems of clogging in the ion exchangers, is treated in a strongly acidic carbonate or hydrogen carbonate ion exchanger. Thereafter, a first portion of the treated sugar solution is treated in a strongly basic ammonium ion exchanger, whereupon the remaining portion which has not been treated in the ammonium ion exchanger, is mixed with the first portion in order to regulate the pH value of the sugar solution.

The present invention aims at solving the problems arising when prior art methods are adopted for desalination of whey.

Thus, the present invention relates to a method for desalination of whey, in which the whey is conducted through an anion exchanger and a cation exchanger, the method being characterized in that the whey is first conducted through a weakly basic anion exchanger in hydrogen carbonate form and thereafter through a weakly acidic cation exchanger in ammonium form, the ion exchangers being regenerated by treatment with an ammonium hydrogen carbonate solution, whereupon the ammonium and hydrogen carbonate ions present in the whey are removed by evaporation. Further, the cation exchange capacity, which decreases in dependence upon the number of treatment cycles, is restored according to the invention in that the cation exchanger is treated, at most, every second and, preferably, every fourth cycle, first with acid and then with alkali.

The invention further relates to an apparatus for carrying out the method, comprising an ion exchange column having one inlet end and one outlet end, the apparatus being connected at its inlet end to means for supplying whey to be desalted and regeneration solution, and means for removing residual acid and alkali, the ion exchange column having, at its outlet end, means for removing spent regeneration solution and supplying acid and alkali, the outlet end further being connected to evaporators for vaporization of treated whey, and the apparatus further comprising a distiller for distillation of spent regeneration solution, and a tank for regeneration solution.

Thus, in the ion exchange technique for desalination of whey according to the present invention, use is made of a weakly basic anion exchanger in $HCO_3^-$ form and of a weakly acidic cation exchanger in $NH_4^+$ form. The whey is first conducted through the weak anion exchanger in which the anions of the whey are exchanged for hydrogen carbonate ions. Thereafter, the whey passes on to the cation exchanger where the cations in the whey are exchanged for ammonium ions. Thus, at the end of the process, whey is obtained in which the normal whey salts have been replaced by $NH_4HCO_3$. This salt is volatile and can be driven off from the whey by heating, suitably in conjunction with the normal vaporization of the whey.

One problem arising in the ion exchange process of the present invention is that the capacity of the cation exchanger decreases according to the number of desalination cycles performed, probably owing to the formation of $CaCO_3$ bridges between the cation exchange grains. The capacity of the anion exchanger remains, however, substantially constant. Since the method of the present invention is based on a balance between cation exchange and anion exchange being maintained in the whey treatment in order to obtain a satisfactory product quality of e.g. desalted whey powder, a reduction in cation exchange means that the possibilities of having an efficient driving-off of the regeneration chemicals in the vaporization and drying processes are reduced. This entails, for instance, that the pH value in a solution of a desalted whey powder will increase as a consequence of the excess of $HCO_3$ ions in the solution. In order to overcome this problem, the cation exchanger is treated at most every second cycle and preferably every fourth cycle, first with acid and then with alkali, the cation exchange capacity being thus re-established and it being possible to maintain the pH value in a solution of a desalted whey powder within the desired range of 6.2–6.5.

To summarize, the method and the apparatus according to the present invention afford substantially the following advantages:

(a) An environmentally beneficial process, since substantially only the natural salts of the whey leave through sewage system (about 4 to 5 kg of salts per $m^3$ of whey).

(b) Low costs for regeneration, since about 87% of regeneration salt ($NH_4HCO_3$) is recovered by simple means in the process.

(c) Small variations in the pH value of the whey during ion exchange, i.e. small risk of protein denaturation and ensuing clogging of ion exchange columns.

(d) Both cation exchanger and anion exchanger are preferably contained in the same column, which reduces installation costs.

(e) The process may be continuous by the use of a plurality of ion exchange columns coupled in parallel.

(f) The ion exchange column is kept in good hygienic condition by the acid-alkali treatment and in that whey treatment is effected at a low temperature.

(g) A high desalination effect is obtained (above 90%).

The invention will be described in greater detail with reference to the accompanying drawings, in which:

FIG. 2 is a diagram showing illustrative analytical results of the method of the invention.

Figure 1:
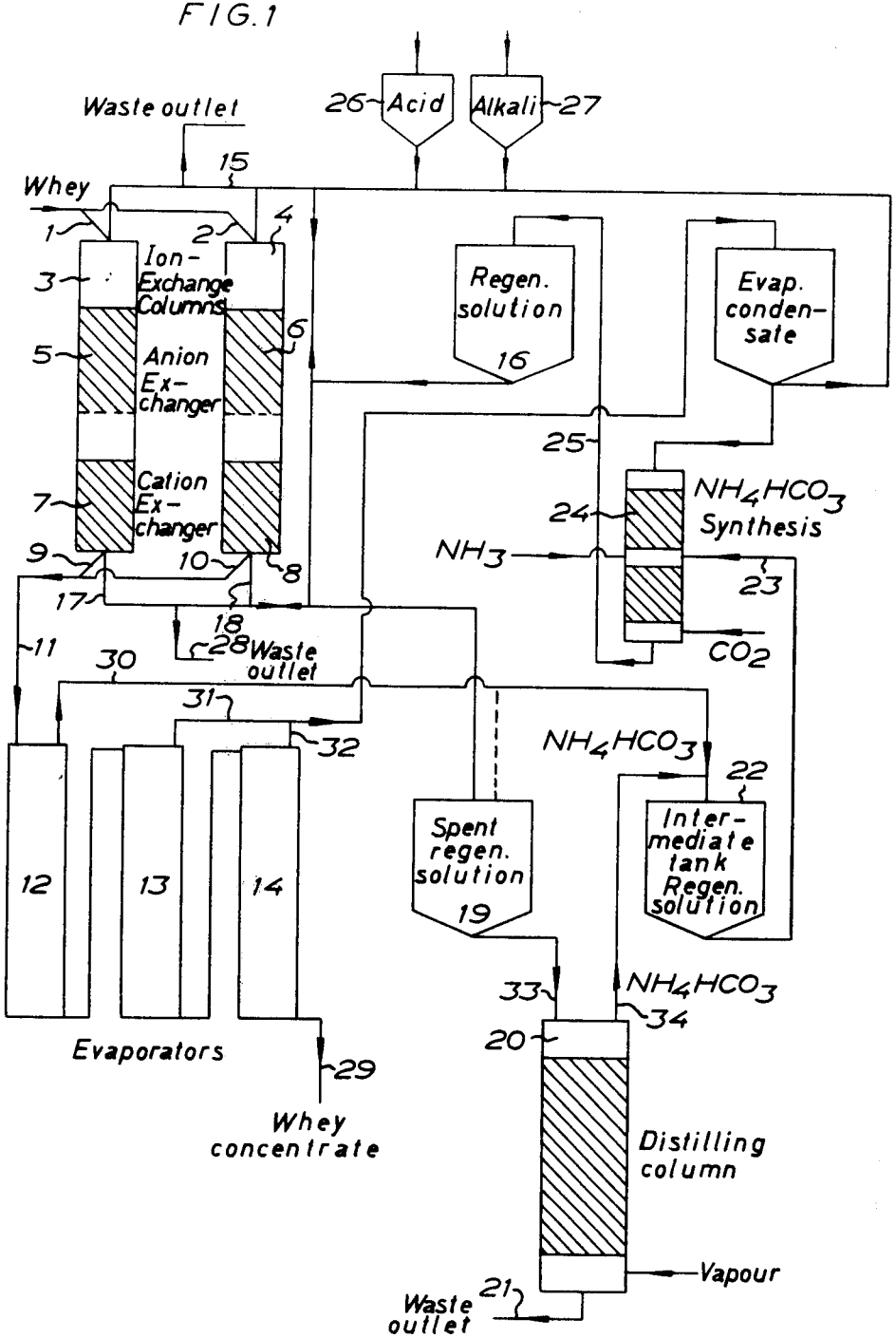
FIG. 1 shows an embodiment of the apparatus of the invention.

In the embodiment of FIG. 1, whey having a total solids content of 6% is supplied through conduits 1 and 2 to the inlet ends of two alternating ion exchange columns 3 and 4. These columns are packed, in the flow direction of the whey, with a weakly basic anion exchanger 5, 6 in hydrogen carbonate form and with a weakly acidic cation exchanger 7, 8 in ammonium form. Thereafter, the treated whey is discharged through the outlet ends of the ion exchange columns via conduits 9 and 10, respectively, and conducted through a conduit 11 to the inlet side of a series of evaporators 12, 13, 14 in which the whey is vaporized to a total solids of about 60% while being at the same time liberated from the ammonium hydrogen carbonate which escapes in the form of ammonia, carbon dioxide and water vapour from the vapour side of the evaporators.

The regeneration solution in the form of a 5% ammonium hydrogen carbonate solution is supplied from a tank 16 via a conduit 15, alternatingly to the inlet ends (or optionally the outlet ends) of the ion exchange columns 3, 4 in order to restore these to $HCO_3^-$ form and $NH_4^+$ form. Subsequent to the treatment of the ion exchangers, the spent regeneration solution is conducted through conduits 17, 18 to a collecting tank 19 in which the concentration of the regeneration solution is about 3%. From the tank 19, the regeneration solution is conducted to a distilling column 20 in which ammonia, carbon dioxide and water vapour are driven off for recirculation to the installation, the salts removed from the whey being discharged through a waste outlet 21. The evaporated gases, i.e. ammonia, carbon dioxide and water vapor obtained from the distilling column 20 and the evaporator 12 are condensed and collected in the form of an approximately 6.5% ammonium hydrogen carbonate solution in an intermediate tank 22 from which the solution is conducted via a conduit 23 to a unit 24 for bringing about a synthesis of fresh $NH_4HCO_3$. The unit 24 is also supplied with vaporization condensate from the evaporators 13 and 14. The regeneration solution is conducted from the unit 24 through a conduit 25 to the tank 16 for recirculation in the system. Hence, about 87% of the ammonium hydrogen carbonate salt is recovered.

After two, at most, and preferably four treatment cycles, the ion exchange columns 3, 4 are treated with acid and alkali supplied from two tanks 26, 27, respectively.

In the choice of suitable weakly basic and weakly acidic ion exchangers for desalination, according to the invention, of whey whose pH value may be expected to range from 6.0 to 6.6, the protolysis rate of the ion exchangers within the concerned pH range is of great importance. Generally speaking, the function of weakly acidic ion exchangers is best at high pH values, whereas the function of weakly basic ion exchangers is best at low pH values. In the preferred embodiment of the present invention, use has been made of cation exchangers, the functional ion exchanging groups of which are carboxylic acid groups, and of anion exchangers, the functional ion exchanging groups of which are tertiary amino groups which, at the pH value of the whey, are completely protolized.

The ion exchangers are kept in good hygienic condition without any bacteriological problems in that, for instance, the whey ion exchange is effected at a low temperature, i.e. 5°–7° C. After the ion exchange, the ion exchangers are backflushed with water at a temperature of about 60° C., and the regeneration is performed preferably with an ammonium hydrogen carbonate solution at a temperature of about 30°–40° C.

EXAMPLE 1

Whey was run at the rate of 0.20 bed volumes per minute through an ion exchange installation for laboratory use, containing two columns packed with anion exchange mass in $HCO_3^-$ form and cation exchange mass in $NH_4^+$ form. The following mean efficiency of the ion exchange was obtained in the treatment of 16.7 bed volumes of whey. One bed volume refers to the volume of cation exchange mass in $NH_4^+$ form.

| Ion | Elimination degree (%) |
| --- | --- |
| Na | 91 |
| K | 93 |
| Ca | 98 |
| Mg | 98 |
| Cl | 94 |
| NO$_3$ | 98 |
| Total phosphor | 79 |

| Ion | Elimination degree (%) |
| --- | --- |
| Citrate | 98 |

EXAMPLE 2

Under conditions similar to those defined above, a number of ion exchange cycles were performed where the desalination effect was estimated by determination of the elimination efficiency for K and Cl (FIG. 2). After seven ion exchange cycles, the cation exchanger was first treated with four bed volumes of 4% hydrocloric acid and then with an equivalent amount of alkali. As seen in FIG. 2, the ion exchange efficiency of the cation exchange could be restored.

As is evident to anyone skilled in the art, the invention can be modified in several different ways within the scope of the appended claims.

What I claim and desire to secure by Letters Patent is:

1. A method for desalination of whey which is conducted through an anion exchanger and a cation exchanger, comprising first conducting the whey through a weakly basic anion exchanger working in hydrogen carbonate form, whereby the anions of the whey are exchanged for hydrogen carbonate ions, and then through a weakly acidic cation exchanger working in ammonium form, whereby the cations of the whey are exchanged for ammonium ions, said ion exchangers being regenerated by treatment with an ammonium hydrogen carbonate solution, whereupon the ammonium and hydrogen carbonate ions present in the whey after the ion exchange process are removed by evaporation in the form of ammonia, carbon dioxide and water vapour, and the capacity of the cation exchanger is restored no more often than every second cycle and no less often than is required to maintain effective ion exchange. by treating said cation exchanger first with acid and then with alkali.

2. Method as claimed in claim 1, further comprising restoring the capacity of the cation exchanger every fourth cycle.

3. Method as claimed in claim 1, comprising using part of the ammonia and carbon dioxide recovered from the evaporation of the whey to form part of the regeneration solution.

4. Method as claimed in claim 1, characterized by distilling spent regeneration solution for driving off ammonia, carbon dioxide and water vapour, the resulting gas mixture being thereafter condensed to form regeneration solution for recirculation to the ion exchangers.

* * * * *